United States Patent
Schaffer et al.

(10) Patent No.: US 11,954,767 B2
(45) Date of Patent: *Apr. 9, 2024

(54) METHODS AND APPARATUS FOR GENERATING A THREE-DIMENSIONAL RECONSTRUCTION OF AN OBJECT WITH REDUCED DISTORTION

(71) Applicant: Cognex Corporation, Natick, MA (US)

(72) Inventors: Martin Schaffer, Jena (DE); Marcus Große, Jena (DE)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,544

(22) Filed: Jan. 20, 2023

(65) Prior Publication Data

US 2023/0222707 A1 Jul. 13, 2023

Related U.S. Application Data

(63) Continuation of application No. 16/555,982, filed on Aug. 29, 2019, now Pat. No. 11,587,268.

(Continued)

(51) Int. Cl.
*G06T 11/00* (2006.01)
*H04N 5/72* (2006.01)
(Continued)

(52) U.S. Cl.
CPC ............. *G06T 11/003* (2013.01); *H04N 5/72* (2013.01); *H04N 13/243* (2018.05); *H04N 13/296* (2018.05); *H04N 2013/0074* (2013.01)

(58) Field of Classification Search
CPC ....... G06T 11/003; G06T 7/521; G06T 7/593; H04N 13/296
See application file for complete search history.

(56) References Cited

U.S. PATENT DOCUMENTS 4,871,256 A * 10/1989 Grindon ................. G02B 26/04
356/610
7,103,212 B2 9/2006 Hager et al.
(Continued)

FOREIGN PATENT DOCUMENTS

CN 102074044 A 5/2011
CN 103389048 A 11/2013
(Continued)

OTHER PUBLICATIONS

Extended European Search Report dated Jan. 24, 2020 in connection with European Application No. 19194627.6.
(Continued)

*Primary Examiner* — Rowina J Cattungal
(74) *Attorney, Agent, or Firm* — Wolf, Greenfield & Sacks, P.C.

(57) ABSTRACT

Methods, systems, and computer readable media for generating a three-dimensional reconstruction of an object with reduced distortion are described. In some aspects, a system includes at least two image sensors, at least two projectors, and a processor. Each image sensor is configured to capture one or more images of an object. Each projector is configured to illuminate the object with an associated optical pattern and from a different perspective. The processor is configured to perform the acts of receiving, from each image sensor, for each projector, images of the object illuminated with the associated optical pattern and generating, from the received images, a three-dimensional reconstruction of the object. The three-dimensional reconstruction has reduced distortion due to the received images of the object being generated when each projector illuminates the object with an associated optical pattern from the different perspective.

20 Claims, 8 Drawing Sheets

Related U.S. Application Data

(60) Provisional application No. 62/725,082, filed on Aug. 30, 2018.

(51) Int. Cl.
*H04N 13/00* (2018.01)
*H04N 13/243* (2018.01)
*H04N 13/296* (2018.01)

(56) References Cited

U.S. PATENT DOCUMENTS

| | | | |
|---|---|---|---|
| 9,170,207 B2* | 10/2015 | Perriollat | G01B 11/2545 |
| 9,952,039 B2* | 4/2018 | Addington | G06T 7/514 |
| 11,037,314 B1* | 6/2021 | Picard | G06T 7/521 |
| 11,587,268 B2 | 2/2023 | Schaffer et al. | |
| 2004/0240754 A1 | 12/2004 | Smith et al. | |
| 2008/0273211 A1 | 11/2008 | Schmitt et al. | |
| 2010/0150399 A1 | 6/2010 | Svajda et al. | |
| 2012/0089364 A1 | 4/2012 | Takabayashi | |
| 2012/0318775 A1 | 12/2012 | Schwarz | |
| 2013/0300637 A1 | 11/2013 | Smits et al. | |
| 2014/0253929 A1* | 9/2014 | Huang | G01N 21/8806 356/611 |
| 2016/0078610 A1 | 3/2016 | Rudd et al. | |
| 2018/0106593 A1* | 4/2018 | Arden | H04N 13/243 |
| 2018/0324396 A1* | 11/2018 | Ishikawa | H04N 9/3194 |
| 2020/0074698 A1 | 3/2020 | Schaffer et al. | |

FOREIGN PATENT DOCUMENTS

| | | |
|---|---|---|
| CN | 103477369 A | 12/2013 |
| CN | 105190232 A | 12/2015 |
| CN | 105700280 A | 6/2016 |
| CN | 108061965 A | 5/2018 |
| CN | 108072335 A | 5/2018 |
| CN | 109923445 A | 6/2019 |
| JP | 2003-262510 A | 9/2003 |
| JP | 2010-249598 A | 11/2010 |
| JP | 2012-127704 A | 7/2012 |
| JP | 2016-522889 A | 8/2016 |
| JP | 6160851 B1 | 7/2017 |
| JP | 2018-081048 A | 5/2018 |
| KR | 10-2017-0083028 A | 7/2017 |
| WO | WO 2014/172231 A | 10/2014 |
| WO | WO 2015/152829 A1 | 10/2015 |

OTHER PUBLICATIONS

Extended European Search Report for European Application No. 21163556.0 dated Jun. 2, 2021.

Sun et al., Object surface recovery using a multi-light photometric stereo technique for non-Lambertian surfaces subject to shadows and specularities. Science Direct. Image and Vision Computing. May 6, 2007; 25(7):1050-1057.

* cited by examiner

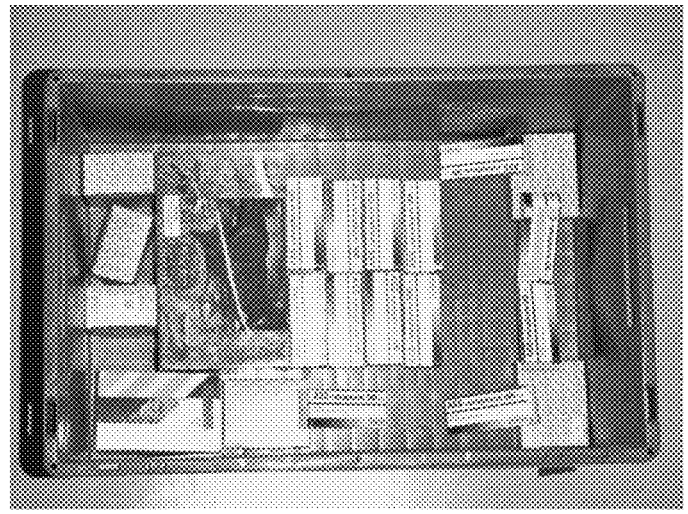
300
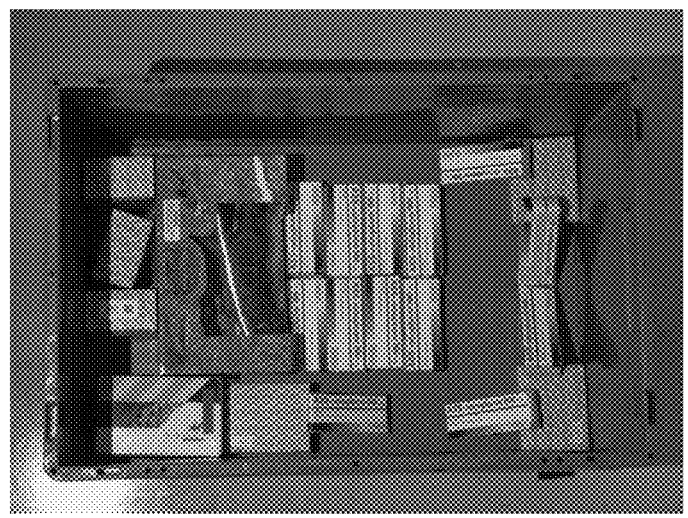
350
FIG. 3

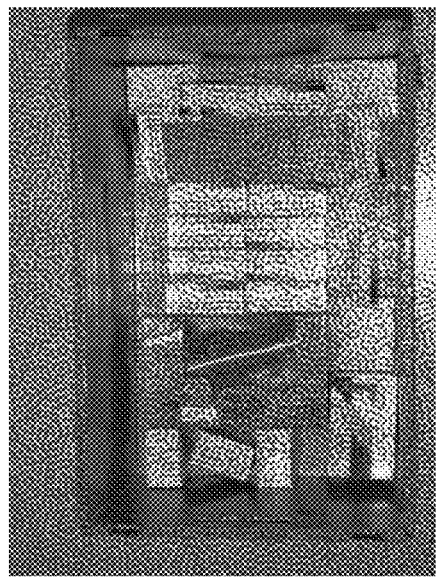
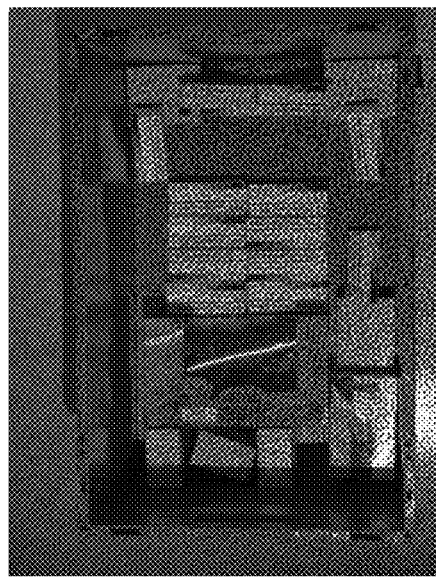
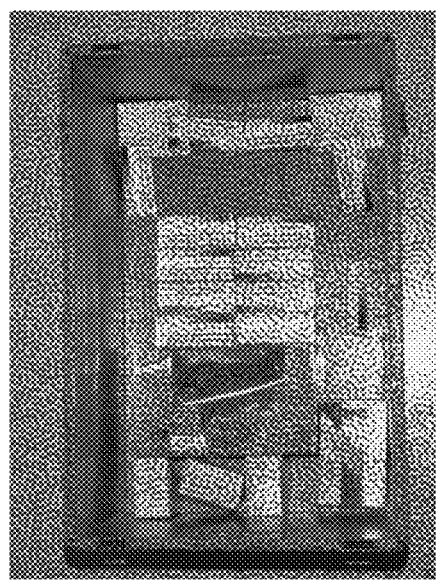
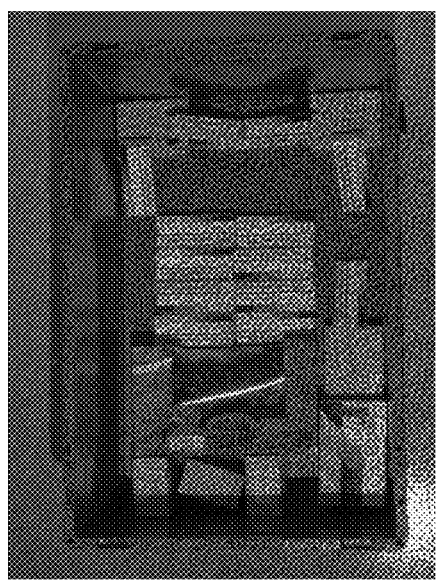
FIG. 4

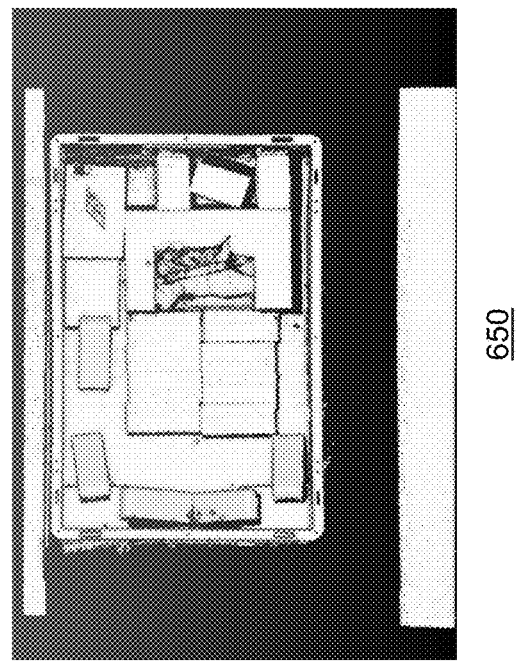
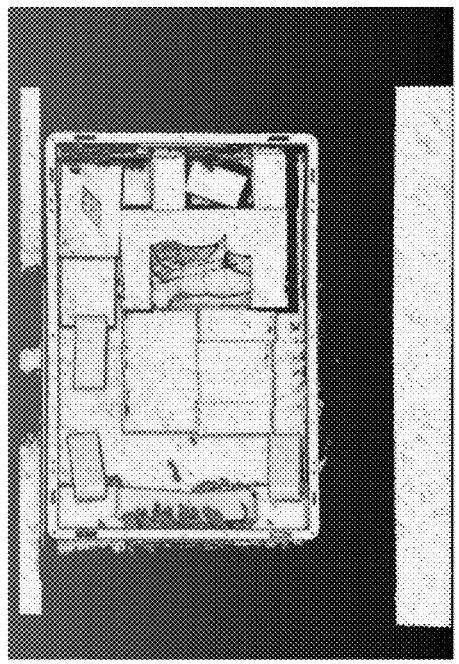
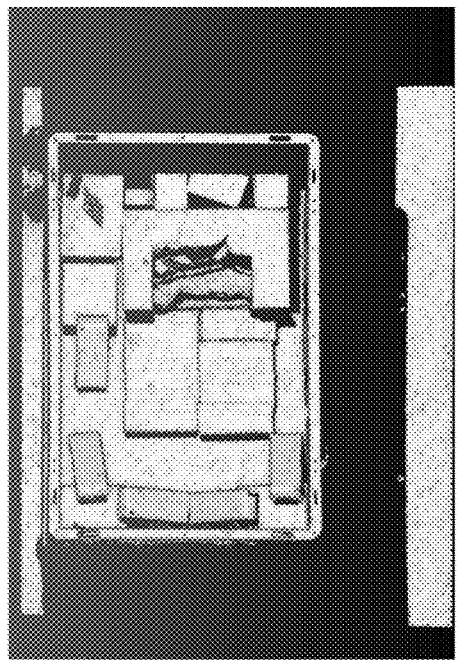
FIG. 6

METHODS AND APPARATUS FOR GENERATING A THREE-DIMENSIONAL RECONSTRUCTION OF AN OBJECT WITH REDUCED DISTORTION

CROSS-REFERENCE TO RELATED APPLICATIONS

This application is a continuation of U.S. patent application Ser. No. 16/555,982, filed on Aug. 29, 2019, entitled "METHODS AND APPARATUS FOR GENERATING A THREE-DIMENSIONAL RECONSTRUCTION OF AN OBJECT WITH REDUCED DISTORTION", which claims priority to U.S. provisional application Ser. No. 62/725,082, filed Aug. 30, 2018, and entitled "METHODS AND APPARATUS FOR GENERATING A THREE-DIMENSIONAL RECONSTRUCTION OF AN OBJECT WITH REDUCED DISTORTION," each of which is hereby incorporated by reference in its entirety.

TECHNICAL FIELD

The techniques described herein relate generally to three-dimensional (3D) reconstruction from two-dimensional images of an object, and in particular for generating a three-dimensional reconstruction of an object with reduced distortion.

BACKGROUND

The use of advanced machine vision systems and their underlying software is increasingly employed in a variety of manufacturing and quality control processes. Machine vision enables quicker, more accurate and repeatable results to be obtained in the production of both mass-produced and custom products. Typical machine vision systems include one or more cameras directed at an area of interest, a frame grabber/image processing elements that capture and transmit images, a computer or onboard processing device, and a user interface for running the machine vision software application and manipulating the captured images, and appropriate illumination on the area of interest.

One form of 3D vision system is based upon stereo cameras employing at least two cameras arranged in a side-by-side relationship with a baseline of one-to-several inches between the cameras. Stereo-vision based systems in general are based on epipolar geometry and image rectification. They may use correlation-based methods or combine with relaxation techniques to find the correspondence in rectified images from two or more cameras. However, images of objects having low surface roughness and high specular reflection can lead to oversaturation in captured images. Conventional stereo vision systems are limited in their ability to create accurate three-dimensional reconstructions of objects from such captured images.

SUMMARY

In accordance with the disclosed subject matter, apparatus, systems, and methods are provided for generating a three-dimensional reconstruction of an object with reduced distortion.

In some aspects, a system, a method, and/or a computer-readable storage medium for generating a three-dimensional reconstruction of an object with reduced distortion may be provided. The system may include at least two image sensors. Each image sensor may be configured to capture one or more images of an object. The system may include at least two projectors configured to illuminate the object with an associated optical pattern. Each projector may illuminate the object from a different perspective. The system may include a processor configured to perform the act of receiving, from each of the at least two image sensors, for each projector of the at least two projectors, images of the object illuminated with the associated optical pattern. The processor may be configured to perform the act of generating, from the received images, a three-dimensional reconstruction of the object. The three-dimensional reconstruction may have reduced distortion due to the received images of the object being generated when each of the at least two projectors illuminates the object with an associated optical pattern from the different perspective.

In some embodiments, one or more of the at least two projectors may not be synchronized with operation of the at least two image sensors.

In some embodiments, the at least two image sensors may be time-synchronized to capture the images of the object at a same time.

In some embodiments, the at least two image sensors are part of at least one subset of a plurality of image sensors, and the at least two image sensors are time-synchronized to capture the plurality of images of the object at a same time.

In some embodiments, the at least two image sensors may include a first image sensor and a second image sensor time-synchronized with each other to capture one or images of the object at a first time, and a third image sensor and a fourth image sensor time-synchronized with each other to capture one or images of the object at a second time different from the first time.

In some embodiments, the at least two image sensors may include a first image sensor, a second image sensor, and a third image sensor time-synchronized to capture the one or images of the object at a same time.

In some embodiments, the at least two projectors may include a first projector and a second projector. The processor may be configured to perform the act of receiving, from the first image sensor, a first set of images of the object illuminated with the optical pattern from the first projector at a first time. The processor may be configured to perform the act of receiving, from the second image sensor, a second set of images of the object illuminated with the optical pattern from the first projector at the first time. The processor may be configured to perform the act of receiving, from the first image sensor, a third set of images of the object illuminated with the optical pattern from the second projector at a second time. The processor may be configured to perform the act of receiving, from the second image sensor, a fourth set of images of the object illuminated with the optical pattern from the second projector at the second time.

In some embodiments, the different perspectives of the at least two projectors may include a first perspective and a second perspective, and an angular separation of the first perspective and the second perspective may be larger than a half-angle of a reflectance cone of a surface of the object.

In some embodiments, the optical pattern may include a moving optical pattern.

In some embodiments, the moving optical pattern may include an optical pattern translating along a circular path.

In some embodiments, the at least two image sensors may include three or more image sensors. A first subset of image sensors, which includes two or more of the three or more image sensors, may be time-synchronized with each other. A second subset of image sensors, which includes one or more of the three or more image sensors not in the first subset of image sensors, may be time-synchronized with each other but not time-synchronized with the first subset of image sensors.

In some embodiments, generating the three-dimensional reconstruction of the object may include identifying a distortion during the generation process and modifying the distortion using the images of the object generated when each of the at least two projectors illuminate the object with its associated optical pattern at different perspectives.

In some embodiments, identifying the distortion may include identifying the distortion in one or more images of a first perspective of the different perspectives. Modifying the distortion may include modifying the distortion based on one or more images of a second perspective of the different perspectives.

In some embodiments, generating the three-dimensional reconstruction of the object includes selecting, from the received images, one or more image points having a high confidence value and generating, based on the selected image points, the three-dimensional reconstruction of the object. The confidence value may be determined based on an oversaturation value, a correlation score with one or more other image points, and/or a modulation value.

In some embodiments, the processor may be configured to perform the act of, prior to the images being captured, generating a first instruction for a first projector of the at least two projectors to illuminate the object with an associated optical pattern, The processor may be configured to perform the act of, subsequent to the images being received, generating a second instruction for the first projector of the at least two projectors to cease illuminating the object with the associated optical pattern.

In some embodiments, at least one of the at least two image sensors comprises a spectral filter adapted to a projector to block environmental light outside the spectral range of the at least two projectors.

In some embodiments, the spectral filter supports multiple spectral bands to support the at least two projectors operating at different wavelengths.

In some aspects, a system, a method, and/or a computer-readable storage medium for generating a three-dimensional reconstruction of an object with reduced distortion may be provided. The system may include at least three image sensors. Each image sensor may be configured to capture one or more images of an object from a different perspective. The system may include a projector configured to illuminate the object with an optical pattern. The projector may not be synchronized with operation of the at least three image sensors. The system may include a processor configured to perform the act of receiving, from each of the at least three image sensors, one or more images of the object illuminated with the optical pattern from the projector. The processor may be configured to perform the act of generating, from the received one or more images, a three-dimensional reconstruction of the object. The three-dimensional reconstruction may have reduced distortion due to the received one or more images of the object illuminated with the optical pattern being generated by each of the at least three image sensors from the different perspective.

In some embodiments, the at least three image sensors may be time-synchronized to capture the one or more images of the object at a same time.

In some embodiments, the at least three image sensors are part of at least one subset of a plurality of image sensors, and the at least three image sensors are time-synchronized to capture the plurality of images of the object at a same time.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3 shows exemplary images of an object captured using a camera with a first projector with a first perspective and a second projector with a second perspective, according to some embodiments;

FIG. 4 shows exemplary images of an object captured using two cameras with a first projector with a first perspective and a second projector with a second perspective, according to some embodiments;

FIG. 6 shows exemplary three-dimensional reconstructions of an object using a first projector with a first perspective and a second projector with a second perspective, according to some embodiments;

DETAILED DESCRIPTION

Figure 1:
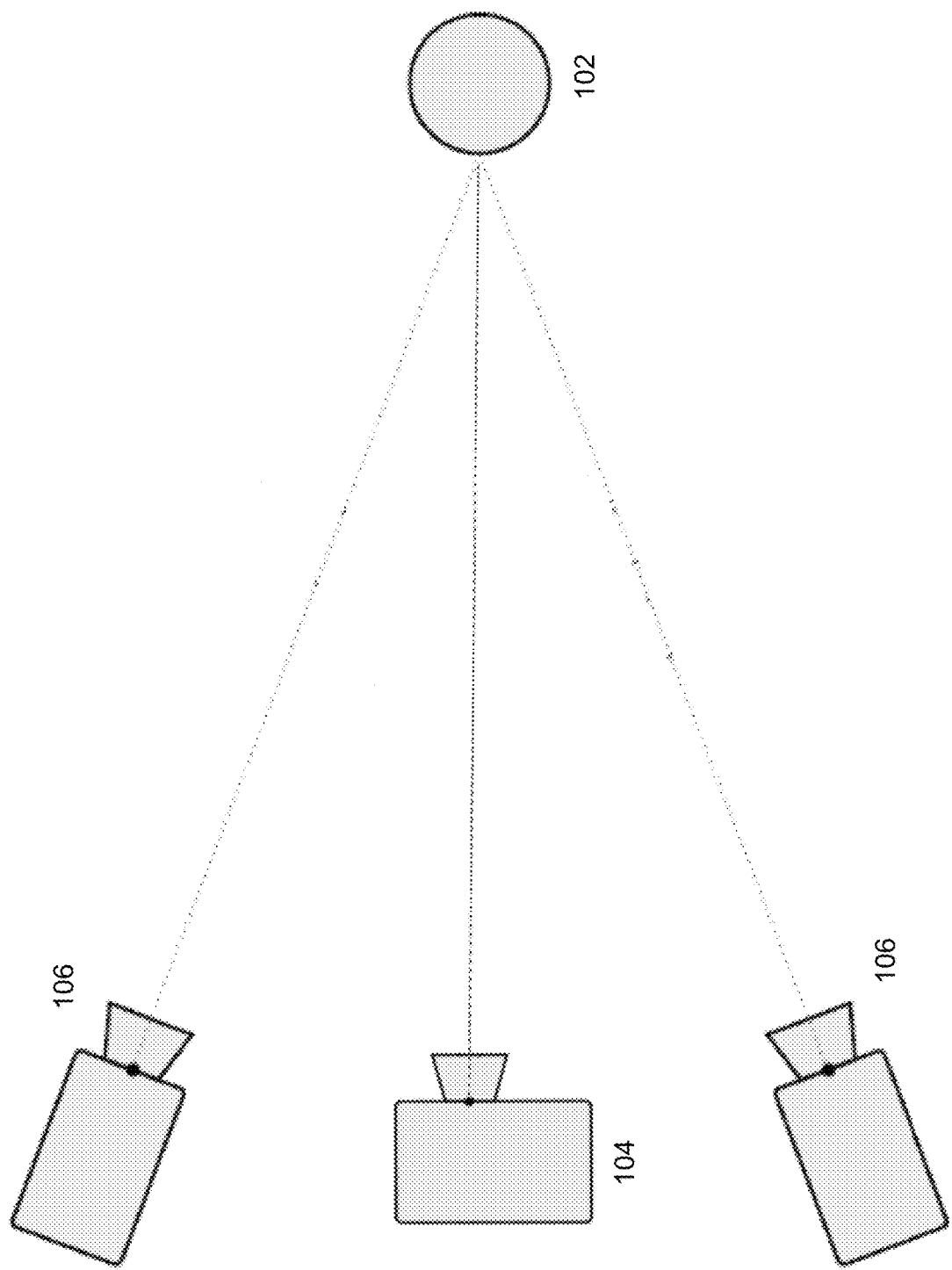
FIG. 1 shows an illustrative embodiment where a projector and two cameras are arranged to capture images of an object in a manner consistent to produce stereo image correspondence, according to some embodiments.

The techniques discussed herein can be used for generating a three-dimensional reconstruction of an object with reduced distortion.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

The inventors have recognized that in certain fields, such as manufacturing, many objects are machined and therefore their surface roughness can be low. Due to low surface roughness, such objects may have a high portion of specular reflection and a low portion of diffuse reflection. Accordingly, such objects can appear shiny in captured images. In another exemplary field involving package inspection, many objects are packed in plastic or foil, have transparent windows, or are colored with gloss additive paint. These objects can also appear shiny in captured images. Subsequently, such captured images can be oversaturated and can hamper the system's ability to create accurate three-dimensional reconstructions of the objects from the captured images. For example, the oversaturation can cause portions of the image to appear as a uniform color or grayscale value (e.g., white) due to illumination of the scene. This can be problematic, for example, because such oversaturation may negatively affect 3D reconstruction (e.g., because the areas do not represent details of the actual scene, because the uniform color makes it difficult to determine correspondences between the stereo image pairs, because the images of a stereo image pair may capture different illumination, and/or the like).

In some embodiments, a three-dimensional reconstruction of an object, e.g., to estimate the 3D shape of an object, can be created using a stereo triangulation system with two cameras and a single projector. The inventors have discovered that certain points in the images captured by the cameras may be oversaturated, such as due to illumination from the projector. For example, for any point of the object where the reflection angle of the projected light falling at the surface of the object is equal to the half-angle between the projector and the first camera (e.g., the camera receiving the reflected light), the image of the object captured by the camera may be oversaturated at that point due to specular reflection. Consequently, for the same point, the image of the object captured by the second camera may be undersaturated, e.g., very dark, at that point. This may happen because most (or all) of the light is reflected into the first camera which fulfills the reflection angle condition. For such points, it may be difficult to reconstruct a 3D estimation of the point due to the extreme difference in saturation between the images captured by the two cameras. In such cases, three-dimensional reconstruction data of the object may be missing information at the points with extreme difference in saturation between the two captured images. This result may be particularly disadvantageous for a flat object, e.g., a cuboid, because large portions of the object may fulfill the reflection angle condition and three-dimensional reconstruction data of the object may be missing information at multiple corresponding points.

In some techniques, the stereo triangulation system may only create 3D points for such object points that are visible to both cameras and the projector. If the projector is occluded or there is an extreme difference between portions of the images, no points may be reconstructed, even at points that are visible to both cameras. In some embodiments, the stereo triangulation system may address issues arising from extreme difference in saturation between two captured images by using polarized light. However, this approach may require a lot of light and may waste more than 75% of the light that is used. Moreover, this approach may not be applicable in applications involving a large field of view, for dark or black objects where it is difficult to overcome the lack of light, and/or the like.

Because the oversaturation may only occur at known or deterministic points (e.g., where the reflection angle of the projected light falling at the surface of the object is equal to the half-angle between the projector and the camera), the inventors have recognized and appreciated that a second projector that emits light from another direction may be used in the 3D vision system. For example, compared to the first projector, the second projector can change the reflection angle of the light for each object point in the captured images, avoid the angle equality issue, and/or reduce oversaturation. While using the stereo triangulation system with the second projector may also lead to specular reflection and oversaturation in images captured using the second projector, such points in the images may be different from the points in the images captured using the first projector. Accordingly, the inventors have recognized and appreciated that capturing one set of 3D points for the object using the first projector, capturing another set of 3D points for the object using the second projector, and combining the two sets of 3D points may result in consistent and dense 3D point data over the whole object. Moreover, the inventors have developed techniques, as discussed further herein, that do not require the projectors and cameras to be synchronized.

In some embodiments, the stereo triangulation system may acquire a set of N images of the scene with a pattern projected by a first projector and generate three-dimensional reconstruction data 3D Data 1 for the object. The system may subsequently acquire another set of N images of the scene with a pattern projected by a second projector and generate three-dimensional reconstruction data 3D Data 2 for the object. Finally, the system may combine 3D Data 1 & 3D Data 2 to create 3D Data for the object with reduced distortion, e.g., due to specular reflection. This process may be advantageous because consistent and dense 3D data for an object may be obtained in a reliable and robust manner without a need for hardware synchronization of the projectors and the cameras. In some embodiments, adding a second projector may help in illuminating a region in the field of view that is not visible to the first projector and may therefore increase the amount of 3D points for the object.

FIG. 1 shows an illustrative embodiment 100 where a projector 104 and two cameras 106 are arranged to capture images of an object 102 in a manner consistent to produce stereo image correspondence. In some embodiments, the projector may project a light or optical pattern on the object, and each camera may capture an image of the object illuminated using the associated light or optical pattern. Each image comprises a set of pixels or image points that make up the image. Each of the cameras described herein, e.g., cameras 106, can include a charge-coupled device (CCD) image sensor, a complementary metal-oxide semiconductor (CMOS) image sensor, or another suitable image sensor. In some embodiments, the camera can have a rolling shutter, a global shutter, or another suitable shutter type. In some embodiments, the camera can have a GigE Vision interface, a Universal Serial Bus (USB) interface, a coaxial interface, a FIREWIRE interface, or another suitable interface. In some embodiments, the camera can have one or more smart functions. In some embodiments, the camera can have a C-mount lens, an F-mount lens, an S-mount lens, or another suitable lens type. In some embodiments, the camera can have a spectral filter adapted to a projector to block environmental light outside the spectral range of the one or more projectors. In some embodiments, the camera's spectral filter supports multiple spectral bands to support multiple projectors operating at different wavelengths.

The projector 104 can use light to project the optical pattern, such as the pattern discussed further in conjunction with FIG. 4. In some embodiments, the projector 104 projects a moving optical pattern. In some embodiments, the moving optical pattern may include an optical pattern translating along a circular path. In some embodiments, the optical pattern may translate along the circular path by shifting in horizontal and/or vertical directions such that the pattern rotates over the object (e.g., without the pattern itself rotating clockwise or counter-clockwise).

Figure 2:
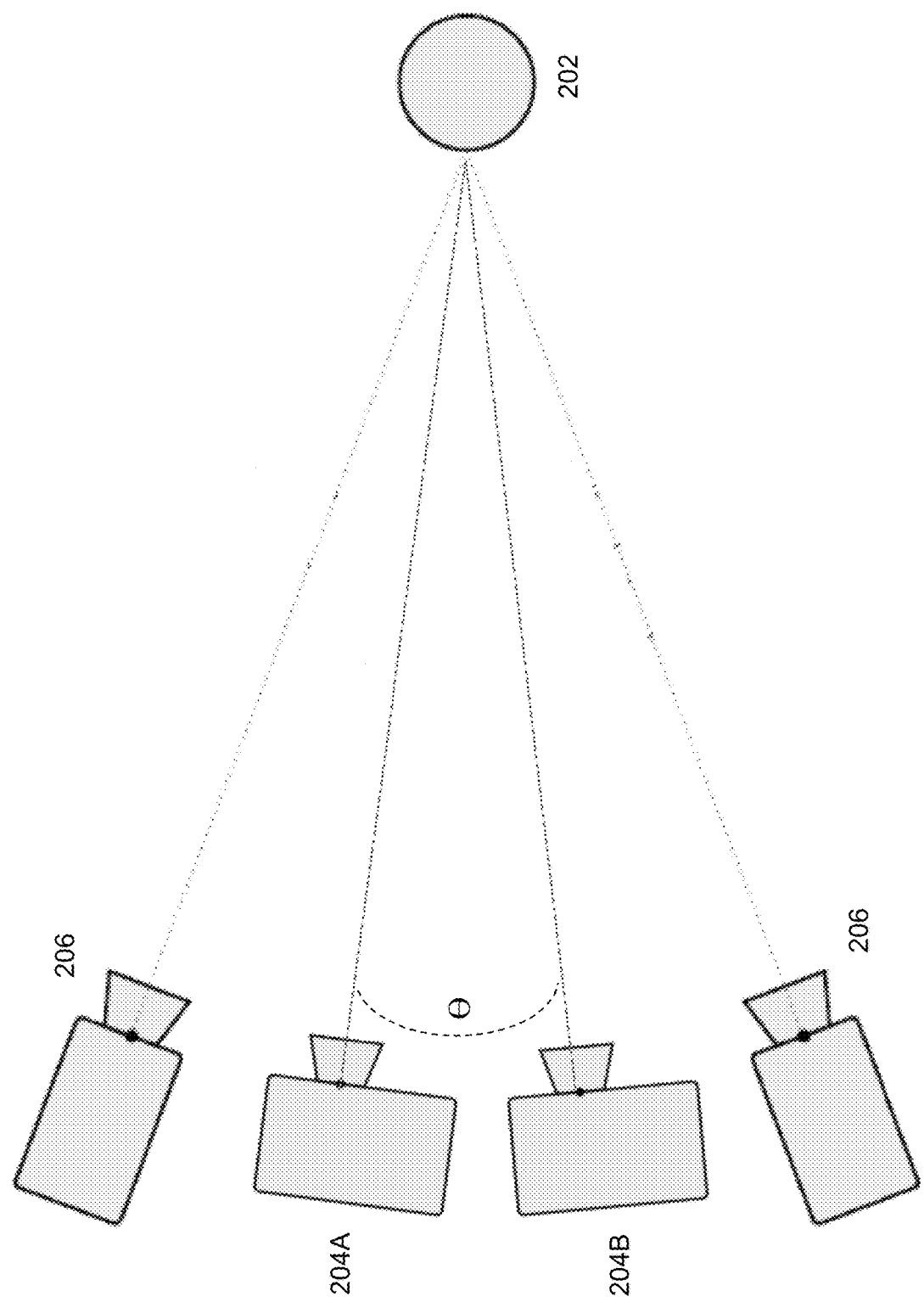
FIG. 2 shows an illustrative embodiment where two projectors and two cameras are arranged to capture images of an object in a manner consistent to produce stereo image correspondence, according to some embodiments.

FIG. 2 shows an illustrative embodiment 200 where two projectors 204A and 204B (collectively referred to as projectors 204) and two cameras 206 are arranged to capture images of an object 202 in a manner consistent to produce stereo image correspondence. The projectors 204 may not be synchronized with operation of the cameras. The projectors 204 may project the same pattern, similar patterns, or different patterns. In some embodiments, for ease of manufacturing the projectors 204, the same pattern may be provided for each projector 204. In some embodiments, the system may issue a start command and/or a stop command for each projector. For example, the start command may be issued before images of the object illuminated by a particular projector 204A are captured by the cameras, and the stop command may be issued after the images of the object illuminated by the particular projector 204A have been captured by the cameras. In some embodiments, to mitigate specular reflection, an angular separation Θ shown in FIG. 2 of the first projector 204A and the second projector 204B may be larger than a half-angle of a reflectance cone of a surface of the object 202.

FIG. 3 shows exemplary images 300 and 350 of an object captured using one camera with a first projector with a first perspective and a second projector with a second perspective, respectively. For example, a first projector (e.g., projector 204A in FIG. 2) may illuminate the object with an optical pattern, and the camera may acquire the image 300. In this example, a start command may be issued for the first projector before image 300 is captured by the camera, and a stop command may be issued for the first projector after the image 300 has been captured by the camera. Continuing with this example, a second projector (e.g., projector 204B in FIG. 2) may illuminate the object with an optical pattern (e.g., same as or different from the optical pattern of the first projector), and the camera may acquire the image 350. In this example, a start command may be issued for the second projector before image 350 is captured by the camera, and a stop command may be issued for the second projector after the image 350 has been captured by the camera.

FIG. 4 shows a first exemplary pair of stereo images 400 and 450 corresponding to a first projected optical pattern and a second exemplary pair of stereo images 402 and 452 corresponding to a second projected optical pattern. For example, a first projector (e.g., projector 204A in FIG. 2) may project an optical pattern on the object, and the cameras 206 may capture the stereo images 400 and 450. Then, a second projector (e.g., projector 204B in FIG. 2) may project an optical pattern on the object (e.g., same as or different from the optical pattern of the first projector), and the cameras (e.g., cameras 206 in FIG. 2) may capture the stereo images 402 and 452. In some embodiments, the cameras may be time-synchronized to capture the images of the object illuminated by a particular projector at the same time. As discussed above, the optical pattern may include a moving optical pattern (e.g., which translates in horizontal and/or vertical directions along a circular path). The cameras can capture sequences of stereo images of the moving optical pattern over time to develop information for each pixel that indicates how the pattern changes over time. This information can be used to search for correspondences between pixels of the images to identify correspondences between the images.

Figure 5:
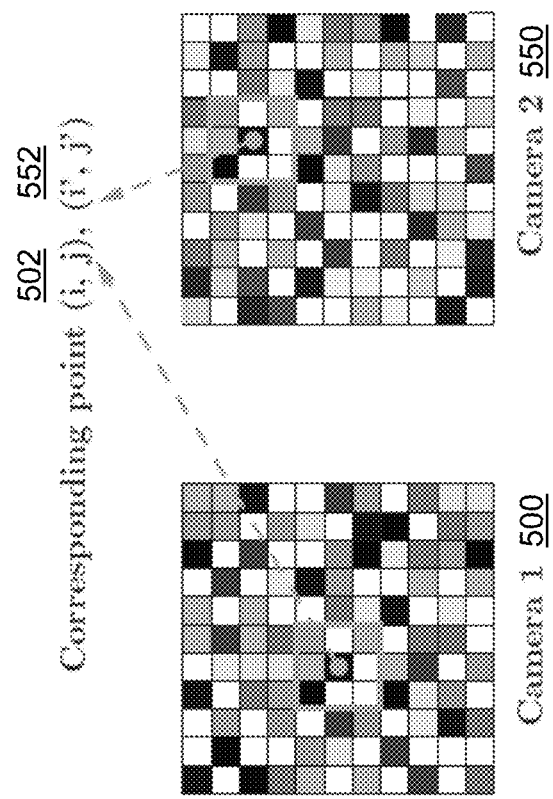
FIG. 5 shows an illustrative pair of stereo images of an object, according to some embodiments.

FIG. 5 shows an illustrative pair of stereo images 500 and 550 (and associated pixels or image points) with corresponding pixels 502 and 552, which represent the same portion of the pattern projected in the images 500 and 550. For example, as discussed above, one of the projectors 204 may project an associated optical pattern on the object, and the cameras 206 may capture the stereo images 500 and 550. The captured stereo images 500 and 550 may be used to identify correspondences across the two pixels. In some embodiments, as discussed herein, sequences of stereo images captured over time may be used to identify correspondences. In some embodiments, in order to reconstruct three-dimensional data from stereo image sequences from the two cameras, corresponding pairs of pixels, such as pixels 502 and 552, may need to be found between the images from each camera.

FIG. 6 shows exemplary three-dimensional reconstructions 600 and 602 of an object using a first projector that projects light on the scene from a first perspective, and a second projector that projects light on the scene from a second perspective. The three-dimensional reconstructions 600 and 602 are exemplary reconstructions of an object prior to any improvement or reduction in distortion.

In order to improve the reconstructions and reduce distortion, the images of the object, e.g., images 400 and 450 and images 402 and 452, may be generated when each projector illuminates the object with an associated optical pattern from a different perspective. In some embodiments, generating the three-dimensional reconstruction of the object may include identifying a distortion during the generation process and modifying the distortion using the images of the object generated when each projector illuminates the object with its associated optical pattern at a different perspective. For example, the distortion may be identified in images captured from the first perspective, and the distortion may be modified based on images captured from the second perspective to produce improved three-dimensional reconstruction 650. In some embodiments, generating the three-dimensional reconstruction of the object may include selecting, from the received one or more images, one or more image points having a high confidence value and generating the three-dimensional reconstruction of the object based on the selected image points. The confidence value may be determined based on an oversaturation value, gray value properties, a correlation score with one or more other image points, and/or a modulation value. In some embodiments, the correlation score may be computed using normalized cross-correlation based on pixel values of the pair of image points to be correlated. In some embodiments, a particular image point may have multiple corresponding image points due to the use of multiple cameras and/or projection directions. In some embodiments, the system may select a corresponding image point from the projection direction that leads to a higher maximum value within the corresponding image points. In some embodiments, the system may select a corresponding image point from the projection direction that leads to a sum of the maximum values of the corresponding points being maximized. In some embodiments, the system may select a corresponding image point that has the highest correlation score. In some embodiments, the system may select a corresponding image point that has the highest modulation value (e.g., standard deviation (root mean square) of the gray values of the corresponding image point in the time domain and/or an average of both temporal sequences involved for the correspondence). In some embodiments, the system may select a corresponding image point that was not affected by oversaturation or least affected by oversaturation (e.g., a lower number of oversaturated gray values in a temporal sequence of the image point).

Figure 7:
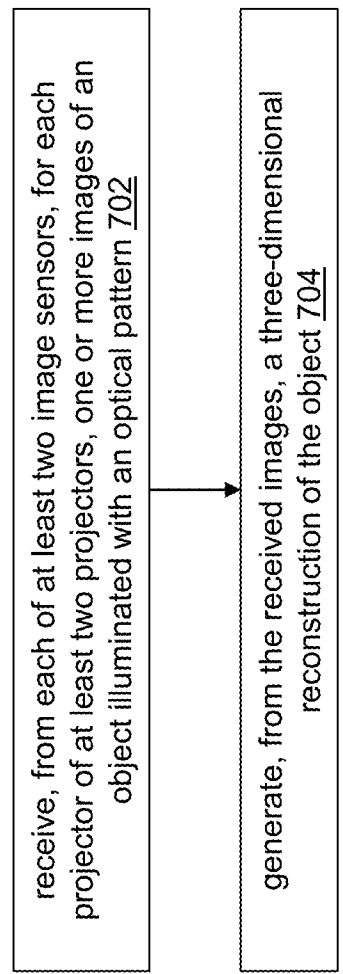
FIG. 7 shows an illustrative flow diagram for generating a three-dimensional reconstruction of an object with reduced distortion, according to some embodiments.

FIG. 7 shows an illustrative computerized method 700 for generating a three-dimensional reconstruction of an object with reduced distortion, according to some embodiments. Method 700 may be performed on any suitable computing system (e.g., a general purpose computing device (CPU), a graphics processing unit (GPU), a field-programmable gate array device (FPGA), an application-specific integrated circuit device (ASIC), an ARM-based device, or another suitable computing system), as aspects of the technology described herein are not limited in this respect.

Figure 8:
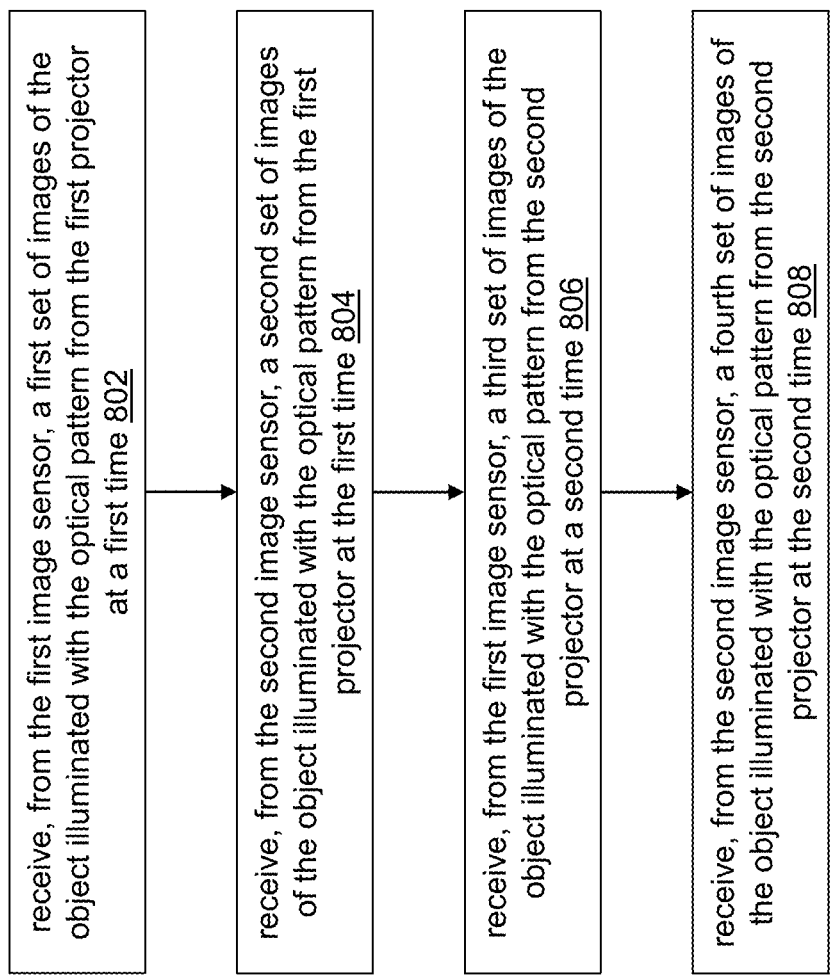
FIG. 8 shows an illustrative flow diagram for receiving one or more images of an object illuminated with an optical pattern, according to some embodiments.

At act 702, the system may receive one or more images of an object illuminated with an optical pattern. The images may be received from each of at least two image sensors and for each projector of at least two projectors. For example, a first projector (e.g., projector 204A in FIG. 2) may illuminate the object with an optical pattern, and a first image sensor and a second image sensor may acquire synchronized N images. Then, a second projector (e.g., projector 204B in FIG. 2) may illuminate the object with an optical pattern (e.g., same as or different from the optical pattern of the first projector), and the first image sensor and the second image sensor may acquire synchronized N images. FIG. 8 shows an illustrative computerized method for act 702, according to some embodiments, which is described below.

In some embodiments, as discussed herein, the projectors may not be synchronized with operation of the image sensors (e.g., the speed at which a moving pattern projected from the projectors moves may not be synchronized with the operation of the image sensors). In some embodiments, the image sensors may be time-synchronized so that each of the image sensors capture images of the object at the same time. In some embodiments, the system may be configured to control which projector illuminates the scene for images captured from the image sensors. For example, the system can be configured to issue a start command and/or a stop command to control operation of the projectors. The start command may be issued for a particular projector to turn on the projector before images are captured by the image sensors, and the stop command may be issued after the images have been captured by the image sensors to turn off the projector. The system may use the start and stop commands to switch between the projectors.

In some embodiments, the different perspectives of the projectors may include a first perspective and a second perspective. The system can be configured with a certain angular separation between the projectors to provide the first and second perspectives. For example, an angular separation of the first perspective and the second perspective can be set so that it is larger than a half-angle of a reflectance cone of a surface of the object.

In some embodiments, images may be received from two image sensors and for one projector. The projector may not be synchronized with operation of the image sensors.

At act 704, the system may generate a three-dimensional reconstruction of the object from the received images. As discussed herein, the three-dimensional reconstruction can be generated in a manner that may have reduced distortion by leveraging the received images of the object that are generated under illumination from different perspectives (e.g., when each projector illuminates the object with an associated optical pattern from the different perspective).

In some embodiments, generating the three-dimensional reconstruction of the object may include identifying a distortion during the generation process, and modifying the distortion using the images of the object generated when each projector illuminates the object with its associated optical pattern at a different perspective. For example, the distortion may be identified in images captured from a first perspective, and the distortion may be modified based on images captured from a second perspective (e.g., which do not have the same distortion due to the angular separation of the illumination perspectives). In some embodiments, generating the three-dimensional reconstruction of the object may include selecting, from the received one or more images, one or more image points having a high confidence value and generating the three-dimensional reconstruction of the object based on the selected image points. The confidence value can reflect a metric that can be used to determine that the image points include information that is useful for the three-dimensional generation process. The confidence value may be determined based on an oversaturation value, a correlation score with one or more other image points, and/or a modulation value. For those points that do not satisfy the confidence value, the system can use the images captured under illumination from a different perspective to complete those portions of the three-dimensional model. In some embodiments, the modulation value may be, e.g., the root mean square of temporal gray values of an image point. In some embodiments, the confidence value may be the result of the normalized cross-correlation of corresponding image points. For example, if corresponding image points are found for the first projection direction and for the second projection direction, the image point from the projection direction yielding a higher correlation value may be selected. In some embodiments, in order to address oversaturation, if one of the corresponding image points is oversaturated, that image point may be neglected. Instead, another corresponding image point from another projection direction, and that is not oversaturated, may be selected.

FIG. 8 shows an illustrative flow diagram for act 702 in FIG. 7, according to some embodiments. Method 800 may be performed on any suitable computing system (e.g., a general purpose computing device (CPU), a graphics processing unit (GPU), a field-programmable gate array device (FPGA), an application-specific integrated circuit device (ASIC), an ARM-based device, or another suitable computing system), as aspects of the technology described herein are not limited in this respect.

At act 802, the system may receive, from the first image sensor, a first set of images of the object illuminated with the optical pattern from the first projector at a first time. The first image sensor may be time-synchronized with the second image sensor to capture the first set of images at the first time.

At act 804, the system may receive, from the second image sensor, a second set of images of the object illuminated with the optical pattern from the first projector at the first time. The second image sensor may be time-synchronized with the first image sensor to capture the second set of images at the first time.

At act 806, the system may receive, from the first image sensor, a third set of images of the object illuminated with the optical pattern from the second projector at a second time. The first image sensor may be time-synchronized with the second image sensor to capture the third set of images at the second time.

At act 808, the system may receive, from the second image sensor, a fourth set of images of the object illuminated with the optical pattern from the second projector at the second time. The second image sensor may be time-synchronized with the first image sensor to capture the fourth set of images at the second time.

In some embodiments, more than two image sensors can be used, and the image sensors can be grouped into subsets (e.g. several pairs) to capture images of the scene at various perspectives. For example, a pair of image sensors may be time-synchronized to capture a set of images of the object at a first time, and another pair of image sensors may be time-synchronized to capture another set of images of the object at a second time (e.g., where the pairs of image sensors may use one or more of the same image sensors). In some embodiments, when using three image sensors, two of the three image sensors may be time-synchronized to capture images at a same time, and the third image sensor may be time-synchronized with the projectors (e.g., since otherwise a single camera may not be able to capture information useful for three-dimensional reconstruction) In some embodiments, if there are more than three image sensors, the image sensors may be divided into first and second subsets. The first subset of image sensors may include one image sensor (e.g., which may be hard synchronized with the projectors), or two or more image sensors time-synchronized with each other. The second subset of image sensors may include one image sensor (e.g., which may be hard synchronized with the projectors), or two or more image sensors time-synchronized with each other, but not time-synchronized with the first subset of image sensors.

The techniques may be configured to use more than two projectors. For example, the cameras can be configured to capture sets of images of the scene under illumination from three (or more) perspectives, using the techniques discussed herein. Using more than two projectors can provide further information of the scene. For example, if the system is unable to determine portions of the three-dimensional reconstruction using images captured under illumination from two different perspectives, the system can use images captured under illumination from a third (or n-th) perspective to complete the three-dimensional reconstruction.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A system for generating a three-dimensional reconstruction of an object with reduced distortion, comprising:
   at least three image sensors, each image sensor configured to capture one or more images of an object from a different perspective;
   a projector configured to illuminate the object with a moving optical pattern translating along a circular path, wherein the projector is not synchronized with operation of the at least three image sensors; and a processor configured to perform acts of:
receiving, from each of the at least three image sensors, a plurality of images of the object illuminated with the moving optical pattern from the projector; and generating, from the received plurality of images, a three-dimensional reconstruction of the object, wherein the three-dimensional reconstruction has reduced distortion due to the received plurality of images of the object illuminated with the moving optical pattern being generated by each of the at least three image sensors from the different perspective.

2. The system of claim 1, wherein the at least three image sensors are time-synchronized to capture the plurality of images of the object at a same time.

3. The system of claim 1, wherein the at least three image sensors are part of at least one subset of a plurality of image sensors, and wherein the at least three image sensors are time-synchronized to capture the plurality of images of the object at a same time.

4. The system of claim 1, wherein the at least three image sensors comprise:
a first image sensor and a second image sensor time-synchronized with each other to capture a first plurality of images of the object at a first time; and
a third image sensor and a fourth image sensor time-synchronized with each other to capture a second plurality of images of the object at a second time different from the first time.

5. The system of claim 1, wherein:
a first subset of image sensors, which comprises two or more of the at least three image sensors, are time-synchronized with each other; and
a second subset of image sensors, which comprises one or more of the at least three image sensors not in the first subset of image sensors, are time-synchronized with each other but not time-synchronized with the first subset of image sensors.

6. The system of claim 1, wherein the moving optical pattern translates along the circular path by shifting in horizontal and/or vertical directions such that the moving optical pattern rotates over the object.

7. The system of claim 1, wherein generating the three-dimensional reconstruction of the object comprises:
selecting, from the received plurality of images, one or more image points having a high confidence value, wherein the confidence value is determined based on an oversaturation value, a correlation score with one or more other image points, and/or a modulation value; and
generating, based on the selected image points, the three-dimensional reconstruction of the object.

8. The system of claim 7, wherein the oversaturation value is computed based on a number of oversaturated gray values in a temporal sequence of an image point of the one or more image points.

9. The system of claim 7, wherein the correlation score with one or more other image points is computed using normalized cross-correlation based on pixel values of a pair of image points to be correlated.

10. The system of claim 7, wherein the modulation value is computed based on a standard deviation of gray values of an image point of the one or more image points in a time domain.

11. The system of claim 7, wherein the modulation value is computed based on an average of a temporal sequence of an image point of the one or more image points and another image point of the one or more image points involved for correspondence.

12. A method for generating a three-dimensional reconstruction of an object with reduced distortion, comprising:
using a processor to perform acts of:
receiving, from each of at least three image sensors, a plurality of images of an object illuminated with a moving optical pattern translating along a circular path, from a projector, wherein each image sensor captures the plurality of images of the object from a different perspective, wherein the projector is not synchronized with operation of the at least three image sensors; and
generating, from the received plurality of images, a three-dimensional reconstruction of the object, wherein the three-dimensional reconstruction has reduced distortion due to the received plurality of images of the object illuminated with the moving optical pattern being generated by each of the at least three image sensors from the different perspective.

13. The method of claim 12, wherein generating the three-dimensional reconstruction of the object comprises:
selecting, from the received plurality of images, one or more image points having a high confidence value, wherein the confidence value is determined based on an oversaturation value, a correlation score with one or more other image points, and/or a modulation value; and
generating, based on the selected image points, the three-dimensional reconstruction of the object.

14. The method of claim 13, wherein the modulation value is computed based on an average of a temporal sequence of an image point of the one or more image points and another image point of the one or more image points involved for correspondence.

15. The method of claim 13, wherein the correlation score with one or more other image points is computed using normalized cross-correlation based on pixel values of a pair of image points to be correlated.

16. The method of claim 13, wherein the modulation value is computed based on a standard deviation of gray values of an image point of the one or more image points in a time domain.

17. The method of claim 16, wherein the moving optical pattern translates along the circular path by shifting in horizontal and/or vertical directions such that the moving optical pattern rotates over the object.

18. The method of claim 13, wherein the oversaturation value is computed based on a number of oversaturated gray values in a temporal sequence of an image point of the one or more image points.

19. At least one non-transitory computer-readable storage medium storing processor-executable instructions that, when executed by at least one computer hardware processor, cause the at least one computer hardware processor to perform acts of:
receiving, from each of at least three image sensors, a plurality of images of an object illuminated with a moving optical pattern translating along a circular path, from a projector, wherein each image sensor captures the plurality of images of the object from a different perspective, wherein the projector is not synchronized with operation of the at least three image sensors; and
generating, from the received plurality of images, a three-dimensional reconstruction of the object, wherein the three-dimensional reconstruction has reduced distortion due to the received plurality of images of the object illuminated with the moving optical pattern being generated by each of the at least three image sensors from the different perspective.

20. The at least one non-transitory computer-readable storage medium of claim 19, wherein generating the three-dimensional reconstruction of the object comprises:
   selecting, from the received plurality of images, one or more image points having a high confidence value, wherein the confidence value is determined based on an oversaturation value, a correlation score with one or more other image points, and/or a modulation value; and
   generating, based on the selected image points, the three-dimensional reconstruction of the object.

* * * * *